United States Patent
Yao et al.

(10) Patent No.: US 8,089,728 B2
(45) Date of Patent: Jan. 3, 2012

(54) HEAD GIMBAL ASSEMBLY, SUSPENSION FOR THE HEAD GIMBAL ASSEMBLY, AND DISK DRIVE UNIT WITH THE SAME

(75) Inventors: Minggao Yao, DongGuan (CN); Koyu Yamanoi, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 344 days.

(21) Appl. No.: 12/458,843

(22) Filed: Jul. 23, 2009

(65) Prior Publication Data

US 2011/0019310 A1    Jan. 27, 2011

(51) Int. Cl.
*G11B 5/48* (2006.01)

(52) U.S. Cl. .................................... 360/234.5
(58) Field of Classification Search ............... 360/234.5
See application file for complete search history.

(56) References Cited

U.S. PATENT DOCUMENTS

| | | | | |
|---|---|---|---|---|
| 5,687,479 A | * | 11/1997 | Bennin et al. | 29/885 |
| 5,768,062 A | * | 6/1998 | Anderson et al. | 360/245.9 |
| 5,786,964 A | * | 7/1998 | Sone et al. | 360/234.5 |
| 5,835,306 A | * | 11/1998 | Bennin | 360/234.5 |
| 5,862,017 A | * | 1/1999 | Kohira et al. | 360/245.6 |
| 5,864,446 A | * | 1/1999 | Endo et al. | 360/244.6 |
| 5,914,834 A | * | 6/1999 | Gustafson | 360/234.5 |
| 6,653,763 B2 | * | 11/2003 | Wang et al. | 310/369 |
| 6,927,946 B2 | * | 8/2005 | Shum et al. | 360/294.3 |
| 6,928,722 B2 | | 8/2005 | Yanagisawa | |
| 7,433,159 B2 | * | 10/2008 | Yao et al. | 360/294.4 |
| 7,554,773 B2 | * | 6/2009 | Zhu et al. | 360/294.4 |
| 7,859,793 B2 | * | 12/2010 | Uematsu et al. | 360/234.6 |

* cited by examiner

*Primary Examiner* — Mark Blouin
(74) *Attorney, Agent, or Firm* — Nixon & Vanderhye PC

(57) ABSTRACT

A HGA comprises a slider and a suspension with a flexure having a tongue region for supporting the slider. A read/write transducer and a piezoelectric element are formed oppositely. The connecting points of the curve beams and the inner tongue of the tongue region are in mirror positions to a center point of the inner tongue, and the connecting points of each curve beam are located at opposite sides of a center axis of the flexure. The slider has multiple electrical pads electrically connecting with the read/write transducer. The inner tongue has multiple electrical pads. The flexure has multiple inner leads electrically connected with the electrical pads of the inner tongue formed on the curve beams. The structure of the HGA prevents the read/write transducer from damaged and cause the manufacture of the HGA simpler. The present invention also discloses a suspension and a disk drive unit.

24 Claims, 10 Drawing Sheets

203

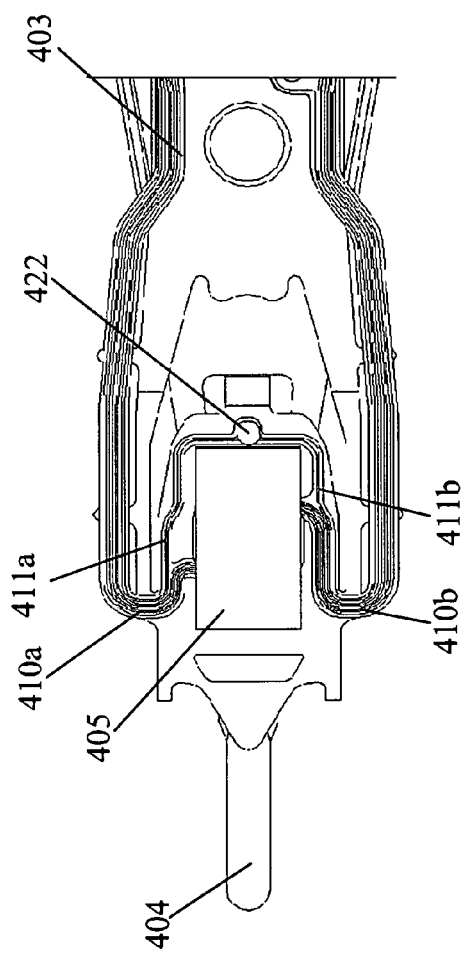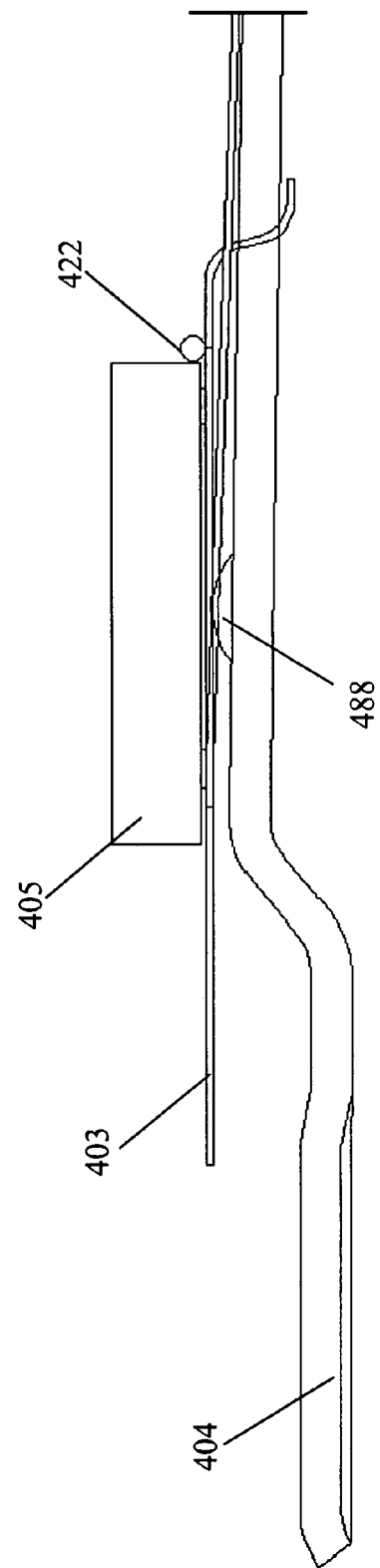
Fig. 4b
Fig. 4c

HEAD GIMBAL ASSEMBLY, SUSPENSION FOR THE HEAD GIMBAL ASSEMBLY, AND DISK DRIVE UNIT WITH THE SAME

FIELD OF THE INVENTION

The present invention relates to an information recording disk drive device, and more particularly, to a head gimbal assembly (HGA), suspension for the HGA, and disk drive unit with the same.

BACKGROUND OF THE INVENTION

Hard disk drive incorporating rotating magnetic disks is commonly used for storing data in the magnetic media formed on the disk surfaces, and a movable read/write transducer is then used to read data from or write to the tracks on the disk surfaces.

As consumers constantly desiring greater storage capacity for such disk drive devices, as well as faster and more accurate reading and writing operations, different methods are used to improve the recording density of information recording disk drive unit. As track density increases, it becomes more and more difficult to quickly and accurately position the read/write transducer over the desired information tracks on the disk. Thus, disk drive manufacturers are constantly seeking ways to improve the positional control of the read/write transducer in order to take advantage of the continual increases in track density.

One approach that has been effectively used by disk drive manufacturers to improve the positional control of read/write transducer for higher density disks is to employ a slider and micro-actuator assembly. FIG. 1 provides an illustration of a typical disk drive unit with a slider. The disk drive device 100 has magnetic hard disks 101, a typical drive arm 104 with a HGA 105 mounted thereon, a spindling voice-coil motor 108 (VCM) for controlling the motion of the drive arm 104, and a spindle motor 102 for spinning the disks 101. The HGA 105 includes a slider 103 with a read/write transducer (not shown) embedded therein and a suspension to support the slider 103. When the disk drive operates, the spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM 108. With a different track, the slider 103 can read data from or write data to the disk 101.

FIGS. 2a-2b show that the slider 103 has a piezoelectric (PZT) element 22 buried in the back side of the floating type slider 103. The slider 103 has a leading edge and a trailing edge opposite the leading edge, a read/write transducer 21 formed at the trailing edge, a PZT element 22 sandwiched between the read/write transducer 21 and the slider body. The PZT element 22 has two electrodes 23 coupling with the PZT layer 25. As illustrated in FIG. 2b, when the slider 103 flies above the disk, the PZT element 22 will deform according to the input voltage, as indicated to a displacement direction 24a of the PZT element 22 which cause a displacement direction 24b of the read/write transducer 21. Thus the position of the read/write transducer 21 can be adjusted.

Another approach that has been used to improve the positional control of read/write transducer is following. As disclosed in U.S. Pat. No. 6,928,722, FIGS. 3a-3b show a slider 203 including a substrate 11, two electrodes layer 15a, 15b attached on the substrate 11, a PZT element 141 sandwiched between the electrodes layer 15a, 15b, and a read/write transducer 12 located on the side of the PZT element 141. Referring to FIG. 3b, when a voltage is applied to the electrode layers 15a and 15b, the PZT element 141 is driven and enables to deform, which accordingly adjusts the position of the read/write transducer 12.

However, as the PZT elements 22 and 141 are located adjacent to the read/write transducer in above-mentioned two approaches, the driving of the PZT elements will produce electrical charge and generate a potential voltage, which will make the read/write transducer damaged in case that, for example, ESD (electrical static discharge damage) problem happens. And the deformation of the PZT elements are not only in head track direction but also in head fly height direction, which means when adjusting the read/write transducer for the position of the head track, the deformation will affect the head flying height performance, thus decreasing the dynamic performance of the slider.

Hence, it is desired to provide an improved HGA and a suspension thereof, and a disk drive with the same to overcome the above-mentioned drawbacks.

SUMMARY OF THE INVENTION

Accordingly, one objective of the present invention is to provide a HGA which can prevent the read/write transducer thereof from damaged and gets better operation performance.

Another objective of the present invention is to provide a suspension for a HGA, which is capable of preventing the read/write transducer of a slider mounted thereon from damaged, and lower the gimbal stiffness and, in turn, gets better operation performance.

Another objective of the present invention is to provide a disk drive unit which prevents the read/write transducer from damaged and gets better operation performance.

To achieve the above-mentioned objectives, a HGA comprises a slider and a suspension with a flexure having a tongue region for supporting the slider. The slider has a substrate with a trailing edge, a leading edge opposite the trailing edge and an air bearing surface connecting the trailing edge with the leading edge, a read/write transducer formed at the trailing edge, and a piezoelectric element formed at the leading edge. The tongue region has an outer tongue and an inner tongue formed within the outer tongue, and a pair of curve beams connecting the inner tongue with the outer tongue. And the connecting points of the curve beams and the inner tongue are in mirror positions to a center point of the inner tongue, and the connecting points of each curve beam are located at opposite sides of a center axis of the flexure along a longitudinal direction thereof. The slider has a plurality of electrical pads electrically connecting with the read/write transducer formed on a surface opposite to the air bearing surface thereof. The inner tongue has a plurality of electrical pads corresponding to the electrical pads of the slider formed thereon. And the flexure further has a plurality of inner leads electrically connected with the electrical pads of the inner tongue formed on the curve beams.

Preferably, the curve beam is semi-surrounding the inner tongue.

Preferably, the pair of curve beams, the outer tongue and the inner tongue form a pair of spaces therebetween.

As an embodiment of the present invention, the flexure has a stainless steel layer, a polymer layer laminated on the stainless steel layer, multiple copper leads laminated on the polymer layer and a polymer cover layer covering the copper leads.

Preferably, the width of the stainless steel layer is narrower than the width of the polymer layer. The stainless steel layer has partial etching hole or cavity with different shape.

Preferably, the copper leads have a multiple layer with a sandwich structure.

As another embodiment of the present invention, the piezoelectric element connects with the leading edge of the substrate via two spaced insulation layers so as to form a space between the piezoelectric element and the leading edge of the substrate.

Preferably, the two spaced insulation layers respectively connect two ends of the piezoelectric element with the leading edge of the substrate.

Preferably, the piezoelectric element comprises a first electrode layer bonded with the leading edge of the substrate and a second electrode layer, and a piezoelectric layer sandwiched between the two electrode layers. And the second electrode comprises two separated segments, and two bonding pads are respectively formed at the two separated segments.

As still another embodiment of the present invention, a bonding pad is deposited on the leading portion of the outer tongue corresponding to the leading edge of the substrate, and connected with the two bonding pads on the two separated segments via an electrical bonding ball.

Preferably, the flexure further comprises a plurality of outer leads configured along the two sides of the outer tongue and connected with the bonding pad of the outer tongue.

Preferably, the flexure further comprises a tip formed adjacent to the bonding pad on the outer tongue.

Preferably, the flexure further comprises a pair of outer triggers formed at the opposite sides of the outer tongue, the pair of outer triggers respectively extend forward and connect with the outer tongue at two weak positions.

A suspension for the HGA comprises a flexure having a tongue region adapted for supporting a slider of the HGA. The tongue region has an outer tongue and an inner tongue formed within the outer tongue and a pair of curve beams connecting the inner tongue at symmetrical positions about a center point of the inner tongue with the outer tongue. And the connecting points of the curve beams and the inner tongue are in mirror relations to a c center point of the inner tongue, and the connecting points of each curve beam are located at the opposite sides of a center axis of the flexure along a longitudinal direction thereof. The inner tongue has a plurality of electrical pads adapted for connecting with the slider, and the flexure further has a plurality of inner leads electrically connected with the electrical pads of the inner tongue formed on the curve beams.

Preferably, the curve beam is semi-surrounding the inner tongue.

Preferably, the pair of curve beams, the outer tongue and the inner tongue form a pair of spaces therebetween.

As an embodiment of the present invention, the flexure has a stainless steel layer, a polymer layer laminated on the stainless steel layer, multiple copper leads laminated on the polymer layer and a polymer cover layer covering the copper leads.

Preferably, the width of the stainless steel layer is narrower than the width of the polymer layer. The stainless steel layer has partial etching hole or cavity with different shape.

Preferably, the copper leads have a multiple layer with a sandwich structure.

Preferably, the flexure further comprises a tip formed adjacent to the bonding pad on the outer tongue.

Preferably, the flexure further comprises a pair of outer triggers formed at the opposite sides of the outer tongue, the pair of outer triggers respectively extend forward and connect with the outer tongue at two weak positions.

A disk drive unit comprises a HGA, a drive arm to connect with the HGA, a disk, and a spindle motor to spin the disk. The HGA comprises a slider and a suspension with a flexure having a tongue region adapted for supporting the slider. The slider has a substrate with a trailing edge, a leading edge opposite the trailing edge and an air bearing surface connecting the trailing edge with the leading edge, a read/write transducer formed at the trailing edge, and a piezoelectric element formed at the leading edge. The tongue region has an outer tongue and an inner tongue formed within the outer tongue, and a pair of curve beams connecting the inner tongue with the outer tongue. And the connecting points of the curve beams and the inner tongue being in mirror relations to a center point of the inner tongue, and the connecting points of each curve beam are located at opposite sides of a center axis of the flexure along a longitudinal direction thereof. The slider has a plurality of electrical pads electrically connecting with the read/write transducer formed on a surface opposite to the air bearing surface thereof, the inner tongue has a plurality of electrical pads corresponding to the electrical pads of the slider formed thereon, and the flexure further has a plurality of inner leads electrically connected with the electrical pads of the inner tongue formed on the curve beams.

In comparison with the prior art, the PZT element is formed at the leading edge of the substrate while the read/write transducer is formed at the trailing edge of the substrate, thus when the PZT element is driven, no potential voltage will be produced on the read/write transducer and the ESD problem will not happen, which accordingly protects the read/write transducer from damaged. Moreover, the electrical pads of the slider connect with the corresponding pads formed on the inner tongue, and the electrical leads are connected to the pads of the inner tongue along the curve beams. And the connecting points of the curve beams and the inner tongue being in mirror relations to a center point of the inner tongue, and the connecting points of each curve beam are located at opposite sides of a center axis of the flexure along a longitudinal direction thereof. When the PZT element is excitated, this structure generates a rotation torque and enables the slider rotating against its center, such that there is no force to transfer to suspension and no additional movement of the suspension excitated, to achieve a better positioning and resonance performance of the HGA and a desired servo bandwidth of the disk drive unit. Further, the curve beams serves as a hinge member, which can lower the gimbal stiffness such that the flying height of the slider can be adjusted more effectively. In addition, the leading edge of the outer tongue has a bonding pad formed thereon, and the bonding pad connects with the two bonding pads of the PZT element of the slider via an electrical bonding ball, causing the manufacture of the HGA simpler and the cost lower.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 4b is a partially enlarged view of the HGA shown in FIG. 4a;

FIG. 4c is a side view of the HGA shown in FIG. 4b;

FIG. 5 is an exploded perspective view of the HGA shown in FIG. 4a;

FIG. 7a shows one way of polarization directions and the input signal of the PZT element of the slider shown in FIG. 6a;

FIG. 7b shows another way of polarization directions the input signal of the PZT element of the slider a shown in FIG. 6a;

FIG. 7c is a schematic view illustrating a working state of the slider of the HGA shown in FIG. 4a;

FIG. 8a shows simulation data of displacement of the slider of the HGA shown in FIG. 4a;

FIG. 8b shows resonance performance of the HGA shown in FIG. 4a; and

DETAILED DESCRIPTION OF ILLUSTRATED EMBODIMENTS

Figure 1:
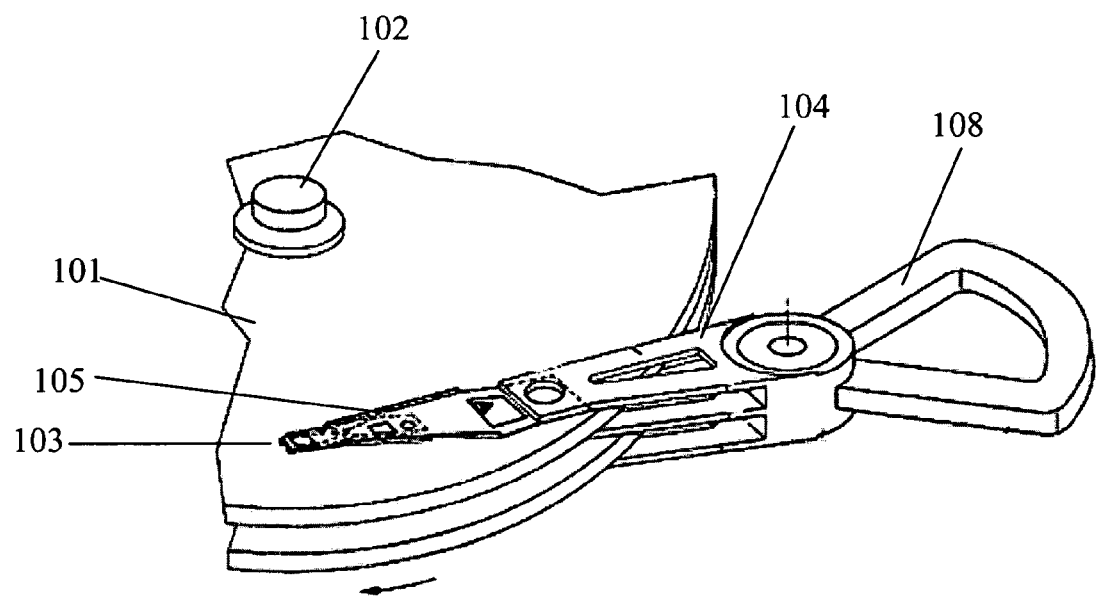
FIG. 1 is a perspective view of a conventional disk drive unit.
Figure 2A:
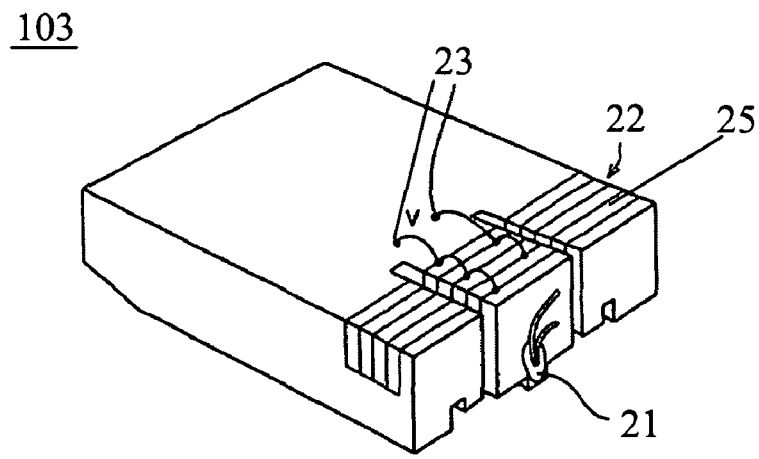
FIG. 2a is a perspective view of a slider of the disk drive unit shown in FIG. 1.
Figure 2B:
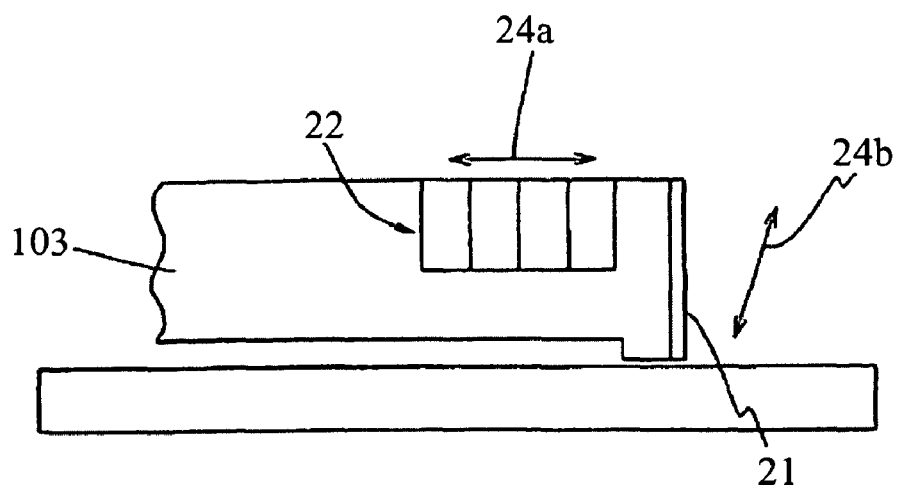
FIG. 2b is a side view of the slider shown in FIG. 2a flying above a magnetic disk.
Figure 3A:
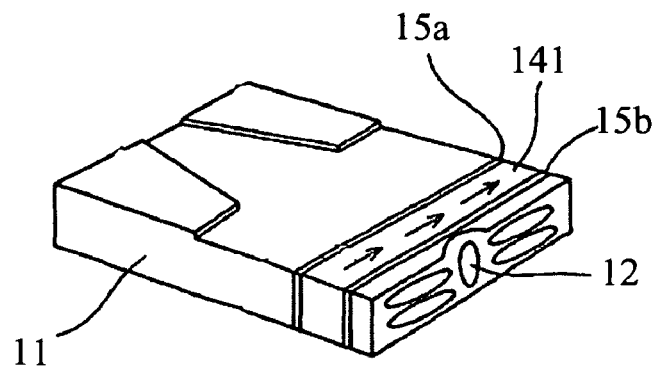
FIG. 3a is a perspective view of another conventional slider of the disk drive unit.
Figure 3B:
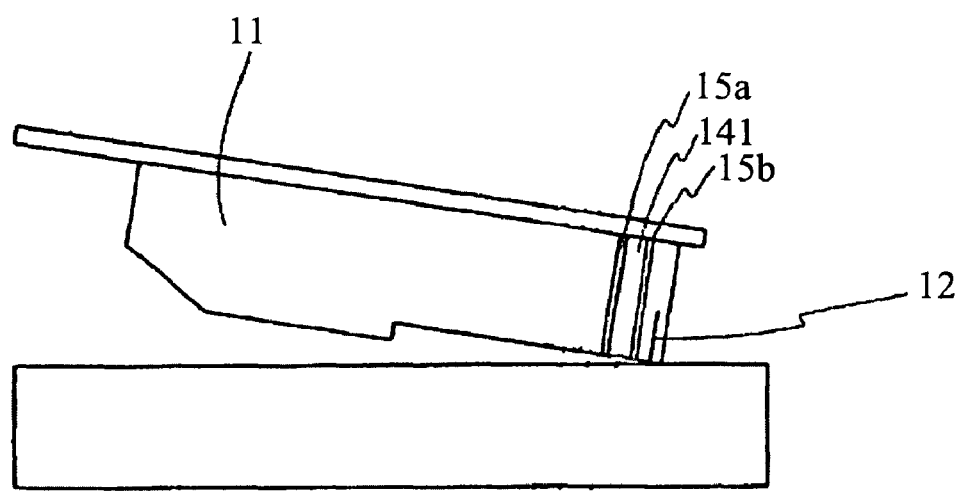
FIG. 3b is a side view of the slider shown in FIG. 3a flying above a magnetic disk.

Various preferred embodiments of the invention will now be described with reference to the figures, wherein like reference numerals designate similar parts throughout the various views. As indicated above, the invention is directed to a HGA which includes a slider having a read/write transducer and a piezoelectric element formed oppositely, such that the HGA can prevent the potential voltage producing on the read/write transducer to protect the magnetic read/write transducer from damaged by the ESD problem and has better performance for positioning the slider.

Figure 4A:
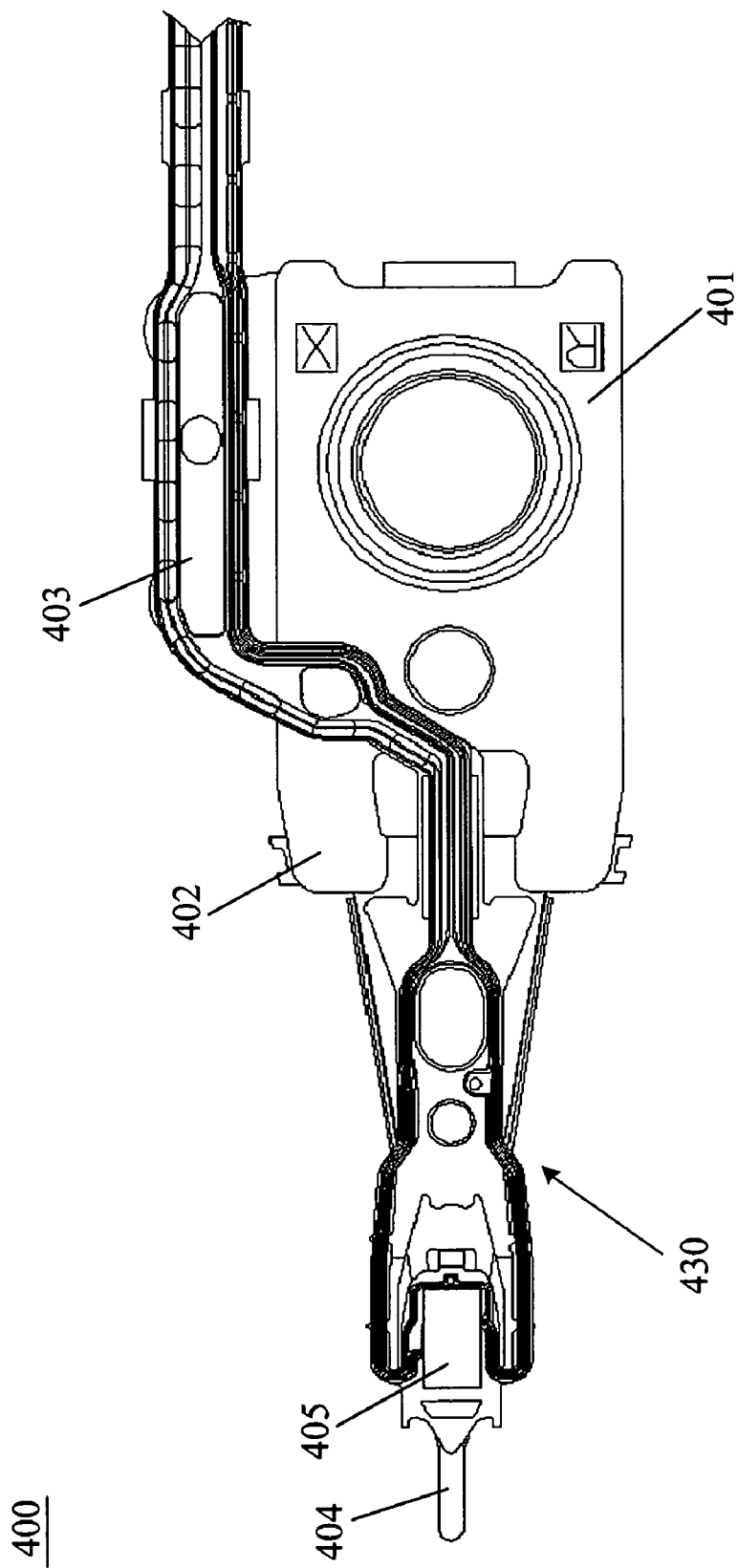
FIG. 4a is a top view of a HGA according to an embodiment of the present invention.

FIGS. 4a-4c illustrates an embodiment of a HGA 400 of the present invention. Referring to FIG. 4a, the HGA 400 generally includes a slider 405 having a read/write transducer 501 (referring to FIG. 6a) imbedded therein, and a suspension 430 for loading or suspending the slider 405 thereon. As illustrated, the suspension 430 includes a base plate 401, a hinge 402, a flexure 403 and a load beam 404, all of which are assembled together.

The load beam 404 is connected to the base plate 401 by the hinge 402, used to transfer load forces to the flexure 403 and the slider 405 mounted on the flexure 403. Any suitable rigid material such as stainless steel may be used to form the load beam 404, such that the load beam 404 has sufficient stiffness to transfer the load forces to the flexure 403.

In conjunction with FIGS. 4b-4c, the flexure 403 is made of flexible material and runs from the hinge 402 to the load beam 404. One end of the load beam 404 is coupled to the base plate 401 which is swaged to the drive arm (not shown), and the other end of the load beam 404 supports a tongue region of the flexure 403. The tongue region of the flexure 403 provides flexibility for the slider 405. In order to smoothly and evenly transfer the load forces from the load beam 404 to the slider 405, the load beam 404 provides a dimple 488 (shown in FIG. 4c) to support the tongue region at a position where the slider 405 is mounted and corresponding to a centre of the slider 405.

Figure 5:
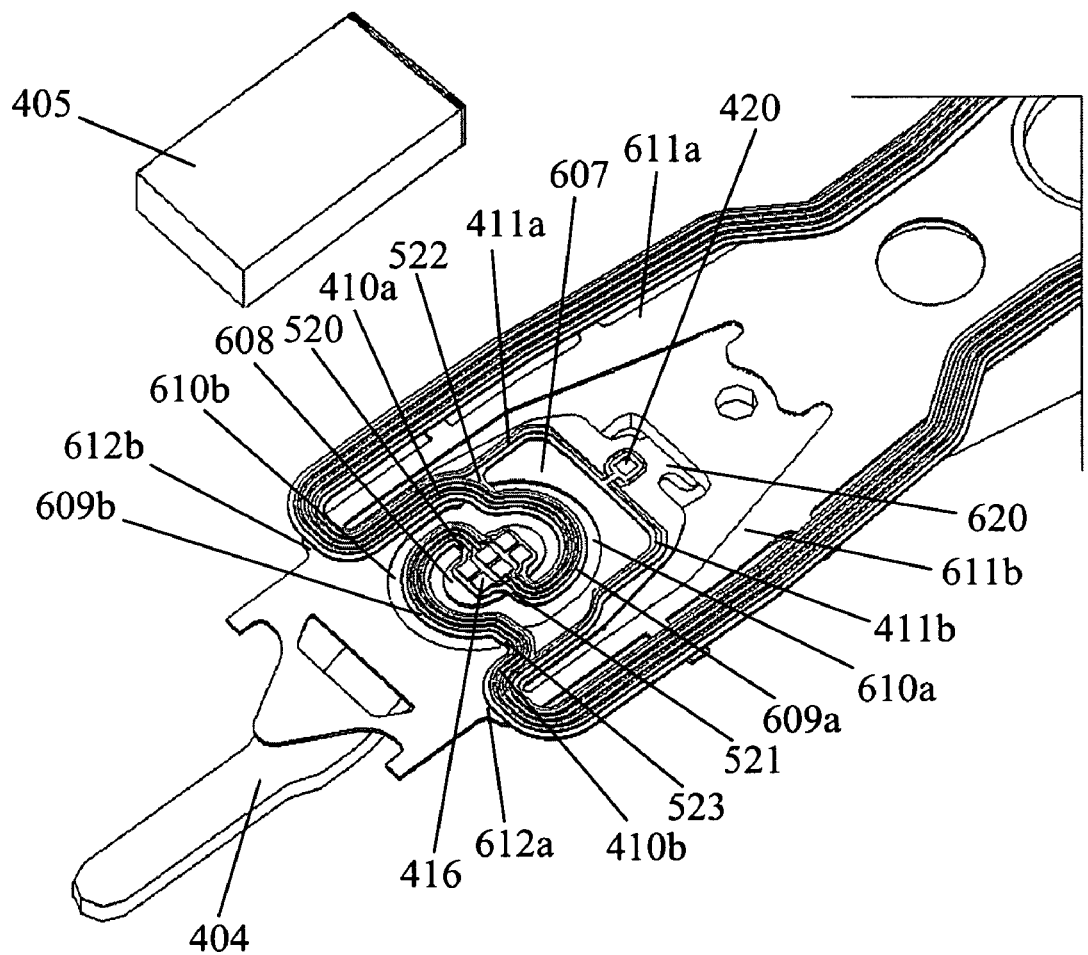

FIG. 5 shows a detailed structure of the HGA shown in FIG. 4a. As illustrated, the tongue region of the flexure 403 for supporting the slider 405 includes an out tongue 607, an inner tongue 608 formed within the outer tongue 607, and a pair of curve beams 609a, 609b connected the inner tongue 608 with the outer tongue 607. The connecting points 520, 521 of the curve beams 609a, 609b are in mirror relations to a center point of the inner tongue 608, which is aimed at a center point of the slider 405. Specifically, the two connecting points of each curve beam, 609a or 609b are located at the opposite sides of a center axis of the flexure 403 along a longitudinal direction thereof. Preferably, the curve beams 609a and 609b are respectively semi-surrounding the inner tongue 608 and mirror symmetry about the center of the inner tongue 608.

The pair of curve beams 609a, 609b together with the out tongue 607 and the inner tongue 608 defines a pair of spaces 610a, 610b. The space 610a locates between the outer tongue 607 and the curve beam 609a and between the curve beam 609b and the inner tongue 608, and extends from the connecting point 520 of the curve beam 609b and the inner tongue 608 to the connecting point 522 of the curve beam 609a and the outer tongue 607, while the space 610b locates between the outer tongue 607 and the curve beam 609b and between the curve beam 609a and the inner tongue 608, and extends from the connecting point 521 of the curve beam 609a the inner tongue 608 to the connecting point 523 of the curve beam 609b and the outer tongue 607.

On a surface of the inner tongue 608 for mounting the slider 405, a plurality of, such as six electrical pads 416 are formed, as illustrated. The pads 416 are connected with the electrical pads (not shown in FIG. 5), which are formed on the back side of the slider 405.

Based on the above structure, the inner tongue 608 of the flexure 403 forms a spring structure to support the slider 405 which maintains the slider 405 have enough low stiffness for flying when loading on the disk. And such a spring structure maintains the slider 405 to have enough displacement when the PZT element is driven. Thus there is no force to transfer to flexure 403, which enables the HGA to get the better dynamic performance, lower gimbal stiffness and better servo bandwidth.

Specifically, the flexure 403 included the outer tongue 607, the inner tongue 608 and the curve beams 609a, 609b has a sandwich structure. More specifically, the flexure 403 include a stainless steel layer, a polymer layer laminated on the stainless steel layer, a multiple copper leads laminated on the polymer layer and a polymer cover layer covering the copper leads. To maintain an enough lower stiffness, the width of the stainless steel layer of the flexure 403 is narrow than width of the polymer layer. Preferably, the stainless steel layer has partial etching hole or cavity with different shape. Selectively, the copper leads have a multiple layer with a sandwich structure. Such a design of sandwich structure of the flexure 403 will keep the slider 405 have an enough displacement when the PZT element is driven, and have an enough support stiffness when flying on the disk.

In addition, a pair of outer triggers 611a, 611b is formed at opposite sides of the outer tongue 607, and the pair of outer triggers 611a, 611b respectively extends forward and connect with the outer tongue 607 at two weak positions 612a and 612b. The introduction of the outer triggers 611a, 611b maintains the outer tongue region of the flexure 403 to possess enough stiffness for supporting the inner tongue 608, to control its static pitch attitude and roll attitude. Since the slider 405 is electrically and mechanically mounted on the inner tongue 608, thus the outer triggers 611a and 611b are functioned to control static pitch attitude and roll attitude of the slider 405, further to control the flying attitude of the slider 405 when flying on the disk. Moreover, a tip 620 is formed at the leading portion of the outer tongue 607, as a limiter to draw with the load beam 404 of the suspension 430. Such a design can prevent the suspension tongue from deforming too much when a shock event or a vibration event happens.

As illustrated in FIG. 5, many electrical leads is formed on the flexure 403, including the outer leads 411a, 411b and the inner leads 410a, 410b. One end of the outer leads 411a, 411b are connected to a preamplifier (not shown), and the other end thereof extends along the two sides of the outer tongue 607. And one end of the inner leads 410a, 410b are connected to the preamplifier as the outer leads 411a, 411b, and the other end thereof extends to the inner tongue 608. More specifically, the inner leads 410a, 410b respectively extend along the curve beam 609a, 609b to connect with the electrical pads 416 on the inner tongue 608.

Figure 6A:
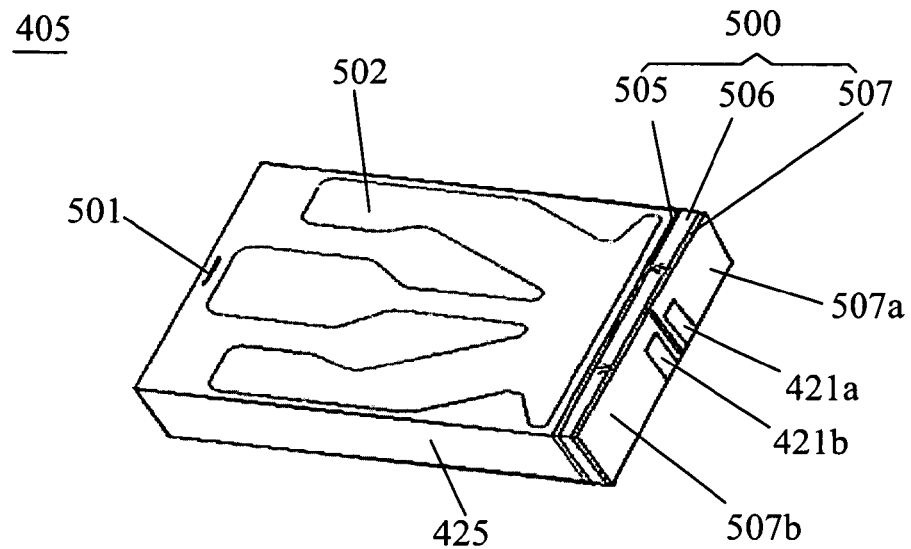
FIG. 6a is a perspective view of a slider of the HGA shown in FIG. 5, showing an air bearing surface of the slider.
Figure 6B:
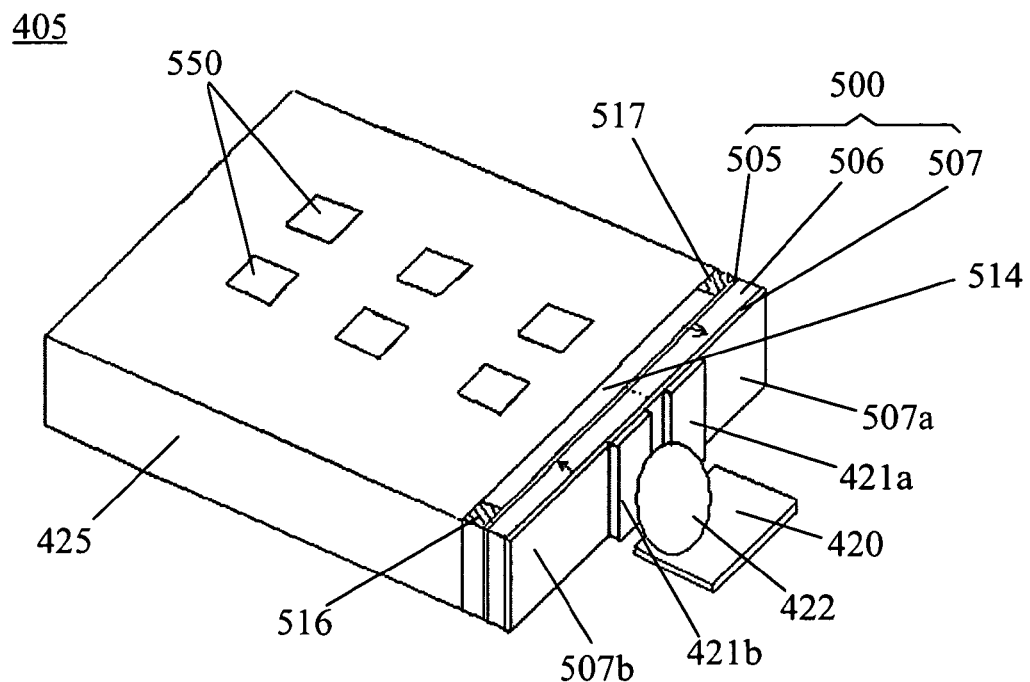
FIG. 6b is another perspective view of the slider shown in FIG. 6a; showing a back surface opposite to the air bearing surface.

Referring to FIGS. 6a-6b, the slider 405 includes a substrate 425 having a trailing edge and a leading edge opposite to the trailing edge, a read/write transducer 501 formed at the trailing edge of the substrate 425 and a PZT element 500 formed at the leading edge of the substrate 425. As the PZT element 500 is formed at the leading edge of the substrate 425 while the read/write transducer 501 is formed at the trailing edge of the substrate 425, when the PZT element 500 is driven, no potential voltage will be produced on the read/write transducer 501 and the ESD problem will not happen, which accordingly protects the read/write transducer 501 from being damaged.

Preferably, the substrate 425, the read/write transducer 501 and the PZT element 500 are integrally formed. In the embodiment, the PZT element 500 connects with the leading edge of the substrate 425 via two spaced insulation layers 516, 517 such as adhesive layers or polymer layers, which forms accordingly a space 514 between the leading edge of the substrate 425 and the PZT element 500.

Concretely, the PZT element 500 includes a first electrode layer 505 bonded with the leading edge of the substrate 425 and a second electrode layer 507 and a piezoelectric layer 506 sandwiched between the two electrode layers. The first electrode layer 505 couples with a common ground. The PZT layer 506 includes two segments which have opposite polarization direction, and the second electrode 507 includes two separated segments 507a and 507b spaced apart from each other. Thus the PZT layer 506 works as two segments through the first electrode layer 505 and the two segments of the second electrode layer 507. As illustrated above, the first electrode layer 505, the PZT layer 506 and the segment 507a of the second electrode layer 507 together form a first segment of PZT element 500, and the first electrode layer 505, the PZT layer 506 and the segment 507b of the second electrode layer 507b together form a second segment of the PZT element 500. The two segments of the PZT element 500 have a common first electrode layer 505 which is commonly grounded. Herein, two bonding pads 421a and 421b are respectively formed at the two separated segments 507a and 507b. As illustrated in FIGS. 6a-6b, the slider 405 has an air bearing surface (ABS) 502, and at a back surface opposite to the ABS 502, on which multiple electrical pads 550 are formed, corresponding to the pads 416 in the inner tongue 608 of the flexure 403 (referring to FIG. 5).

Referring to FIG. 5 again, at the leading portion of the outer tongue 607 corresponding to the leading edge of the substrate 425 of the slider 405, there is a bonding pad 420 deposited for connecting with the bonding pads 421a and 421b (shown in FIG. 6b). The outer leads 411a and 411b are connected jointly with the bonding pad 420. When assembling the slider 405 to the suspension tongue, the electrical pads 550 of the slider 405 and the electrical pads 416 of the inner tongue 608 are electrically and physically connected with each other by metal ball bonding artifice, such as soldering ball bonding. Following is a detailed description for the assembling and the operation of the slider.

Referring to FIGS. 5, 6a-6b again, when assembling the slider 405 to the suspension tongue, a set of corresponding electrical bonding balls (not shown) such as the solder balls are formed and used to electrically and mechanically connect the electrical pads 550 of the slider 405 with the electrical pads 416 of the inner tongue 608. As illustrated in FIGS. 5 and 6b, an electrical bonding ball 422, such as a solder ball is formed to connect the bonding pads 421a and 421b of the two segments of the PZT element 500 with the bonding pad 420 of the outer tongue 607, such that the two segments of the PZT element 500 are parallel connected between the first electrode layer 505 and the bonding ball 422. Such a design of one solder ball bonding is simpler, decreases the cost of manufacturing, and has benefit to the operation of the slider 405.

Figure 7A:
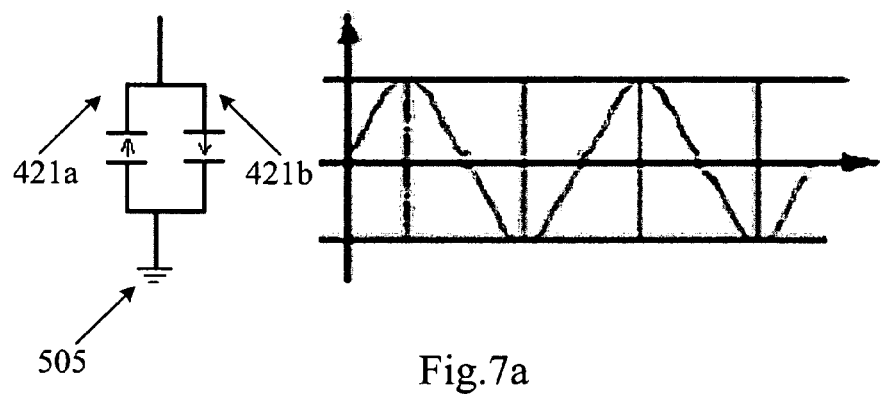
Figure 7B:
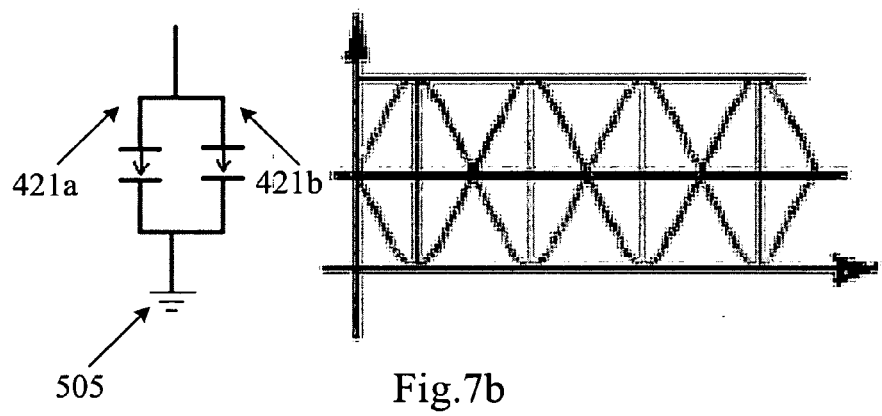

The following will illustrate operational principle of the slider 405. Referring to FIG. 7a, the first segment of PZT element 500 and the second segment of PZT element 500 posses opposed polarization directions. When the first electrode layer 505 is grounded and the segments 5071a, 507b of the second electrode layers 507 are applied with the same phase sine voltage via pads 4211a, 421b, one of the PZT elements will shrink and the other PZT elements will extend. Referring to FIG. 7b, the first segment of PZT element 500 and the second segment of PZT element 500 posses the same polarization directions. When the first electrode layer 505 is grounded and the second electrode layers 507a, 507b are applied with the opposed phase sine voltage via pads 421a, 421b, one segment of the PZT element will shrink and the other segment will extend.

Figure 7C:
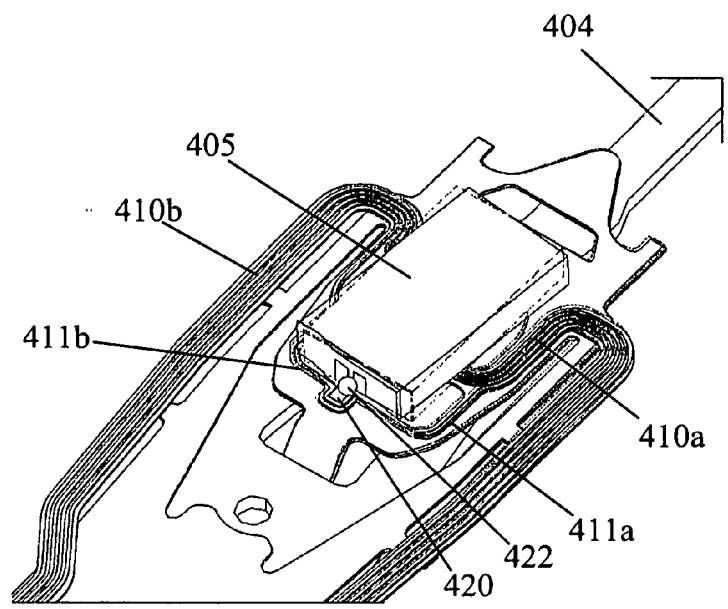

When one segment of the PZT element 500 shrinks and the other segment extends, it will generate a rotate torque. Since the middle region of the two segments of PZT element 500 is fixed to the suspension 430 via one bonding ball 422, and one end of each segment of the PZT element 500 is connected respectively to the spaced insulation layers 516 and 517, to form the space 514. Because of such a design of the slider 405, with the bonding ball 422 served as a fulcrum, the deformation of the first and second segment of the PZT element 500 mentioned in above two ways will generate a rotation torque to the substrate 425 of the slider 405, which accordingly causes the substrate 425 with the read/write transducer 501 rotates against a center thereof. FIG. 7c illustrates a state of the slider 405 of the HGA shown in FIG. 4a after being displaced, the dash lines indicate the original state of the slider 405.

On the other hand, as described above, the outer tongue 607 couples with the inner tongue 608 which supports the slider 405, and the pair of symmetrical curve beam 609a, 609b couple with the inner tongue 608 and the outer tongue 607, forming a spring structure to support the slider 405, thus when generating a rotation torque from the PZT element deformation, the slider 405 will rotate against its center and no force is transferred to flexure 403, causing the read/write transducer 501 located on the trailing edge of the slider 405 move, and the position of the read/write transducer 501 can be adjusted.

In addition, the spring structure can decrease the stiffness of the flexure 403 and, in turn, can improve the dynamic performance of the slider 405.

Figure 8A:
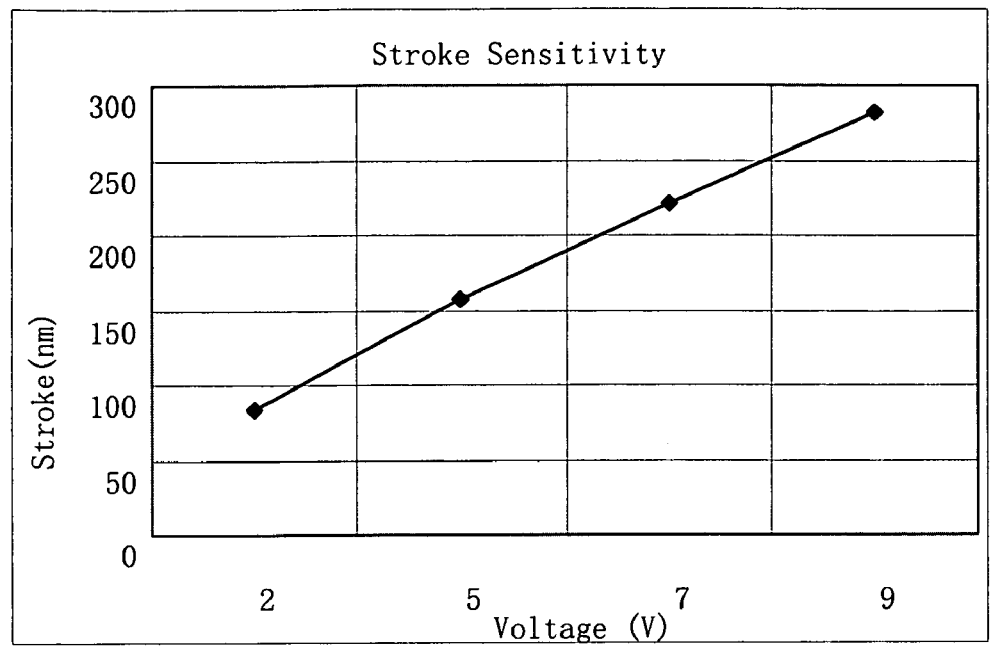
Figure 8B:
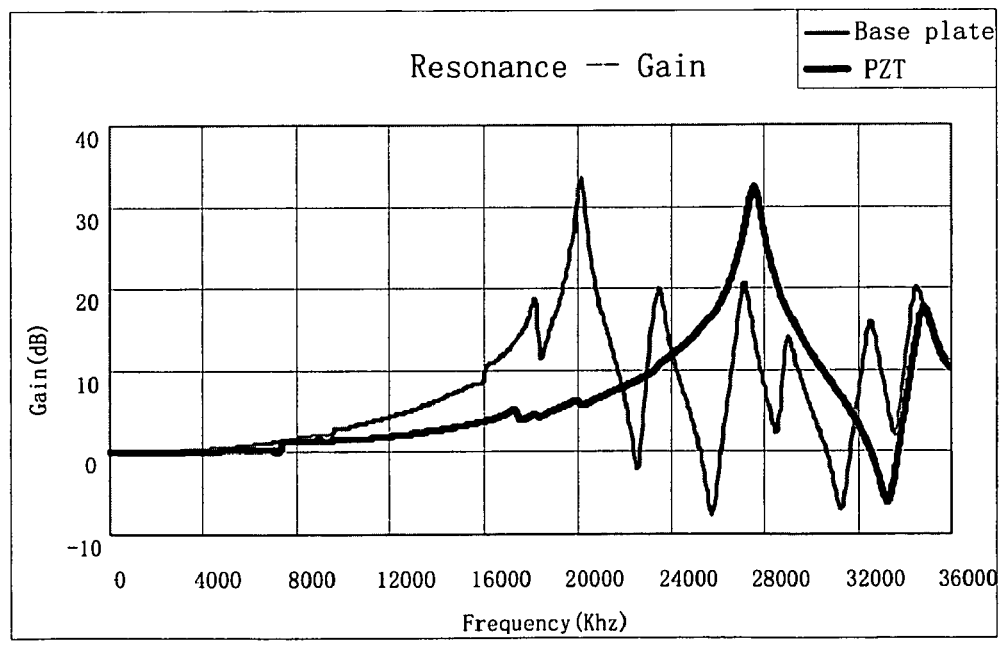

FIG. 8a shows a simulation data of displacement of the slider 405 of the present invention. The displacement increases significantly seen from the figure, which demonstrates good dynamic performance and adjustment capability. FIG. 8b shows resonance performance of the HGA, since the slider 405 purely rotates against the dimple 488 via the spring structure of the tongue region of the flexure 403, there is no reaction force transfer to suspension when operates the slider 405, making the resonance curve very clean in lower frequency area, and there is only a resonance peak of the slider 405 integrated with a micro-actuator, which enables a significant improvement on the capability of the read/write transducer position adjustment and the desired servo bandwidth.

Figure 9:
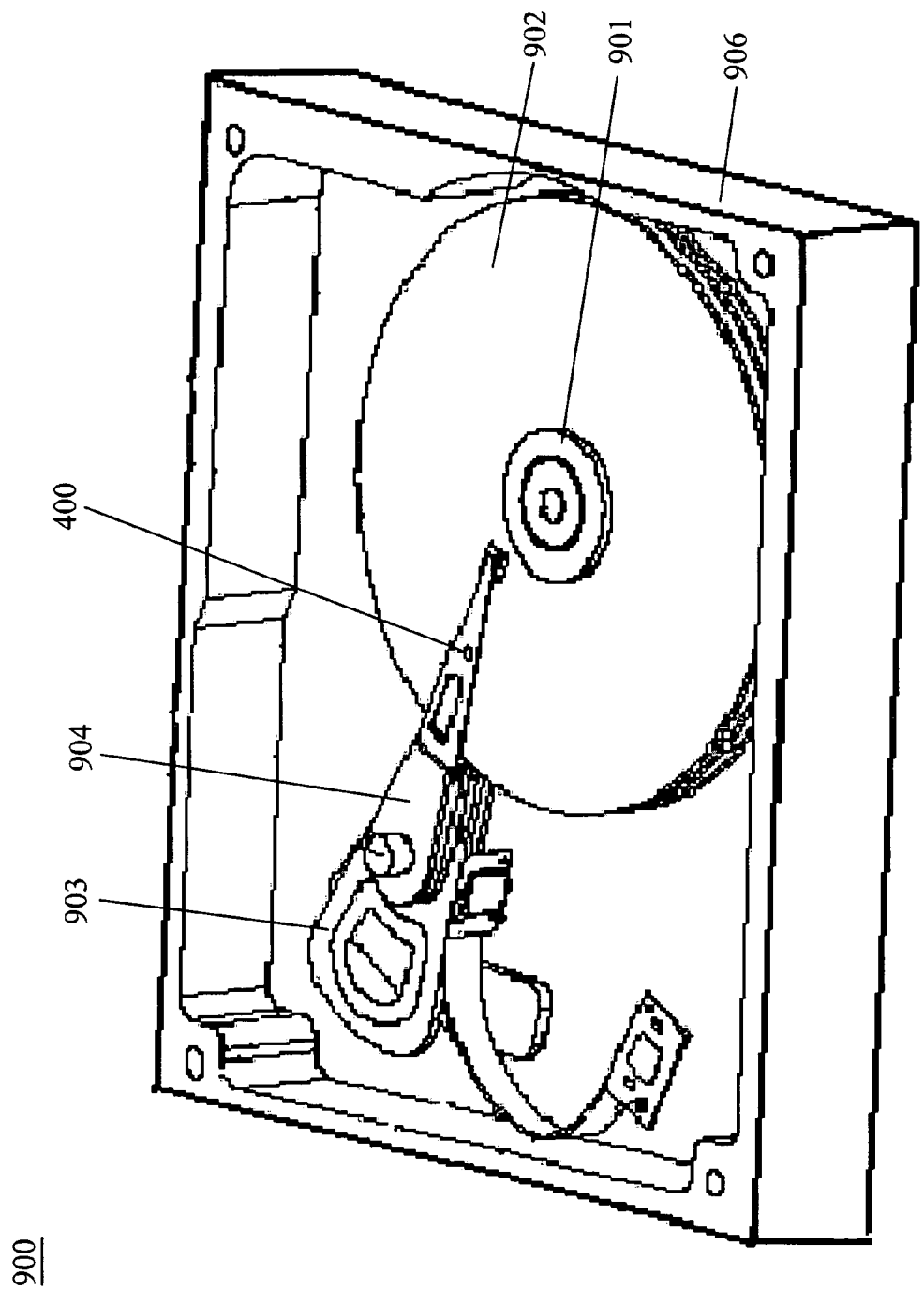
FIG. 9 is a perspective view of a disk drive unit with the HGA according to one embodiment of the present invention.

FIG. 9 is a disk drive unit including the HGA according to an embodiment of the invention. The disk drive unit 900 includes a spindle motor 901, a series of the rotatable disks 902 mounting on the spindle motor 901, a voice coil motor 903, and a drive arm 904 connecting with the HGA 400 according to the present invention, all of which are mounted in a housing 906. As the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head gimbal assembly comprising:
a slider having a substrate with a trailing edge, a leading edge opposite the trailing edge and an air bearing surface connecting the trailing edge with the leading edge, a read/write transducer formed at the trailing edge, and a piezoelectric element formed at the leading edge; and
a suspension with a flexure having a tongue region for supporting the slider, the tongue region having an outer tongue, an inner tongue formed within the outer tongue and a pair of curve beams connecting the inner tongue with the outer tongue, the connecting points of the curve beams and the inner tongue being in mirror positions to a center point of the inner tongue, and the connecting points of each curve beam located at opposite sides of a center axis of the flexure along a longitudinal direction thereof;
wherein the slider has a plurality of electrical pads electrically connecting with the read/write transducer formed on a surface opposite to the air bearing surface thereof, the inner tongue has a plurality of electrical pads corresponding to the electrical pads of the slider formed thereon, and the flexure further has a plurality of inner leads electrically connected with the electrical pads of the inner tongue formed on the curve beams.

2. The head gimbal assembly as claimed in claim 1, wherein the curve beam is semi-surrounding the inner tongue.

3. The head gimbal assembly as claimed in claim 1, wherein the pair of curve beams, the outer tongue and the inner tongue form a pair of spaces therebetween.

4. The head gimbal assembly as claimed in claim 1, wherein the flexure has a stainless steel layer, a polymer layer laminated on the stainless steel layer, multiple copper leads laminated on the polymer layer and a polymer cover layer covering the copper leads.

5. The head gimbal assembly as claimed in claim 4, wherein the width of the stainless steel layer is narrower than the width of the polymer layer.

6. The head gimbal assembly as claimed in claim 4, wherein the stainless steel layer has partial etching hole or cavity with different shape.

7. The head gimbal assembly as claimed in claim 4, wherein the copper leads have a multiple layer with a sandwich structure.

8. The head gimbal assembly as claimed in claim 1, wherein the piezoelectric element connects with the leading edge of the substrate via two spaced insulation layers so as to form a space between the piezoelectric element and the leading edge of the substrate.

9. The head gimbal assembly as claimed in claim 8, wherein the two spaced insulation layers respectively connect two ends of the piezoelectric element with the leading edge of the substrate.

10. The head gimbal assembly as claimed in claim 1, wherein the piezoelectric element comprises a first electrode layer bonded with the leading edge of the substrate and a second electrode layer, and a piezoelectric layer sandwiched between the two electrode layers.

11. The head gimbal assembly as claimed in claim 10, wherein the second electrode comprises two separated segments, and two bonding pads are respectively formed at the two separated segments.

12. The head gimbal assembly as claimed in claim 11, wherein a bonding pad is deposited on the leading portion of the outer tongue corresponding to the leading edge of the substrate, and connected with the two bonding pads on the two separated segments via an electrical bonding ball.

13. The head gimbal assembly as claimed in claim 12, wherein the flexure further comprises a plurality of outer leads configured along the two sides of the outer tongue and connected with the bonding pad of the outer tongue.

14. The head gimbal assembly as claimed in claim 13, wherein the flexure further comprises a tip formed adjacent to the bonding pad on the outer tongue.

15. The head gimbal assembly as claimed in claim 1, wherein the flexure further comprises a pair of outer triggers formed at the opposite sides of the outer tongue, the pair of outer triggers respectively extend forward and connect with the outer tongue at two weak positions.

16. A suspension for the head assembly gimbal, comprising:
a flexure having a tongue region adapted for supporting a slider of the head assembly gimbal, the tongue region having an outer tongue, an inner tongue formed within the outer tongue and a pair of curve beams connecting the inner tongue with the outer tongue, the connecting points of the curve beams and the inner tongue being in mirror relations to a center point of the inner tongue, and the connecting points of each curve beam located at the opposite sides of a center axis of the flexure along a longitudinal direction thereof;
wherein the inner tongue has a plurality of electrical pads adapted for connecting with the slider, and the flexure further has a plurality of inner leads electrically connected with the electrical pads of the inner tongue formed on the curve beams.

17. The suspension as claimed in claim 16, wherein the curve beam is semi-surrounding the inner tongue.

18. The suspension as claimed in claim 16, wherein the pair of curve beams, the outer tongue and the inner tongue form a pair of spaces therebetween.

19. The suspension as claimed in claim 16, wherein the flexure has a stainless steel layer, a polymer layer laminated on the stainless steel layer, a multiple copper leads laminated on the polymer layer and a polymer cover layer covering the copper leads.

20. The suspension as claimed in claim 19, wherein the width of the stainless steel layer is narrower than the width of the polymer layer.

21. The suspension as claimed in claim 19, wherein the stainless steel layer has partial etching hole or cavity with different shape.

22. The suspension as claimed in claim 19, wherein the copper leads has a multiple layer with a sandwich structure.

23. The suspension as claimed in claim 16, wherein the flexure further comprises a pair of outer triggers formed at the opposite sides of the outer tongue, the pair of outer triggers respectively extend forward and connect with the outer tongue at two weak positions.

24. A disk drive unit comprising:
a head gimbal assembly;
a drive arm to connect with the head gimbal assembly;
a disk; and
a spindle motor to spin the disk
wherein the head gimbal assembly comprises:
a slider having a substrate with a trailing edge, a leading edge opposite the trailing edge and an air bearing surface connecting the trailing edge with the leading edge, a read/write transducer formed at the trailing edge, and a piezoelectric element formed at the leading edge; and
a suspension with a flexure having a tongue region for supporting the slider, the tongue region having an outer tongue, an inner tongue formed within the outer tongue, and a pair of curve beams connecting the inner tongue with the outer tongue, the connecting points of the curve beams and the inner tongue being in mirror relations to a center point of the inner tongue, and the connecting points of each curve beam located at opposite sides of a center axis of the flexure along a longitudinal direction thereof;
wherein the slider has a plurality of electrical pads electrically connecting with the read/write transducer formed on a surface opposite to the air bearing surface thereof, the inner tongue has a plurality of electrical pads corresponding to the electrical pads of the slider formed thereon, and the flexure further has a plurality of inner leads electrically connected with the electrical pads of the inner tongue formed on the curve beams.

* * * * *